United States Patent
Grund et al.

(10) Patent No.: US 10,800,923 B2
(45) Date of Patent: Oct. 13, 2020

(54) HIGH WET FAST DISPERSE DYE MIXTURES

(71) Applicant: DyStar Colours Distribution GmbH, Raunheim (DE)

(72) Inventors: Clemens Grund, Hattersheim (DE); Manfred Hoppe, Kürten (DE); Adrian Murgatroyd, Frankfurt am Main (DE); Werner Tiβen, Odenthal (DE); Fanny Vermandel, Eppstein (DE)

(73) Assignee: DyStar Colours Distribution GmbH (DE)

(*) Notice: Subject to any disclaimer, the term of this patent is extended or adjusted under 35 U.S.C. 154(b) by 0 days.

(21) Appl. No.: 16/340,857

(22) PCT Filed: Sep. 13, 2018

(86) PCT No.: PCT/EP2018/074706
§ 371 (c)(1),
(2) Date: Apr. 10, 2019

(87) PCT Pub. No.: WO2019/068443
PCT Pub. Date: Apr. 11, 2019

(65) Prior Publication Data
US 2020/0231820 A1    Jul. 23, 2020

(30) Foreign Application Priority Data
Oct. 2, 2017 (EP) .................................... 17194371

(51) Int. Cl.
| C09B 67/00 | (2006.01) |
| C09B 67/22 | (2006.01) |
| C09B 67/44 | (2006.01) |
| D06P 1/18 | (2006.01) |
| D06P 3/54 | (2006.01) |

(52) U.S. Cl.
CPC ...... *C09B 67/0046* (2013.01); *C09B 67/0083* (2013.01); *D06P 1/18* (2013.01); *D06P 3/54* (2013.01)

(58) Field of Classification Search
CPC ............ C09B 67/0046; C09B 67/0041; C09B 67/0051; C09B 67/0083; D06P 3/26; D06P 3/56; D06P 1/18; D06P 3/54
See application file for complete search history.

(56) References Cited

U.S. PATENT DOCUMENTS

| 3,980,634 | A | 9/1976 | Weaver |
| 5,550,217 | A | 8/1996 | Trottmann |
| 5,939,579 | A | 8/1999 | Herzig et al. |
| 6,008,332 | A | 12/1999 | Herzig et al. |
| 6,555,664 | B1 | 4/2003 | Lauk et al. |
| 7,824,450 | B2 | 11/2010 | Jordan et al. |
| 2016/0280922 | A1* | 9/2016 | Gao ................. C09B 29/0003 |

FOREIGN PATENT DOCUMENTS

| EP | 0436940 A1 | 7/1991 |
| EP | 0555179 A1 | 8/1993 |
| EP | 0667376 A1 | 8/1995 |
| EP | 0894830 A2 | 2/1999 |
| EP | 2868702 A1 | 5/2015 |
| EP | 3063228 A2 | 9/2016 |
| WO | WO-00040656 A1 | 7/2000 |
| WO | WO-02068539 A1 | 9/2002 |
| WO | WO-02074864 A1 | 9/2002 |
| WO | WO-2004044058 A1 | 5/2004 |
| WO | WO-2005056690 A1 | 6/2005 |
| WO | WO-2008049758 A2 | 5/2008 |
| WO | WO-2009037215 A2 | 3/2009 |
| WO | WO-2015062937 A2 | 5/2015 |

OTHER PUBLICATIONS

STIC Search Report dated May 18, 2020.*
Written Opinion of the International Searching Authority for PCT/EP2018/074706 mailing date not available.

* cited by examiner

*Primary Examiner* — Eisa B Elhilo
(74) *Attorney, Agent, or Firm* — Faegre Drinker Biddle & Reath LLP

(57) ABSTRACT

The present invention is directed to dye mixtures comprising dye(s) of formula (1)

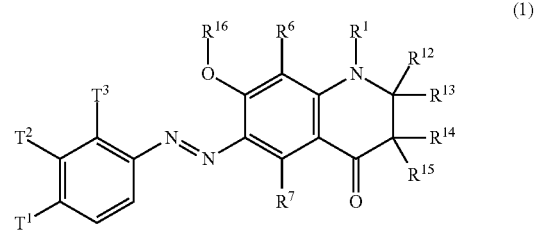

and specific other dyes, the process for the production of these mixtures as well as their use for dyeing textiles.

14 Claims, No Drawings

HIGH WET FAST DISPERSE DYE MIXTURES

CROSS-REFERENCE TO RELATED APPLICATIONS

This application is a national stage application (under 35 U.S.C. § 371) of PCT/EP2018/074706, filed Sep. 13, 2018, which claims benefit of European Application No. 17194371.5, filed Oct. 2, 2017, both of which are incorporated herein by reference in their entirety.

This invention relates to high wet fast disperse dye mixtures.

Disperse azo dyes of formula (1) and their production process are already known, e.g. from EP 3 063 228, but they do have some deficiencies in application properties.

Surprisingly it was now found that specific dyes of formula (1) mixed with selected other disperse dyes of formulae (3a) to (3i) have improved application properties on polyester and polyester blends especially in wet fastnesses, built-up and lightfastness properties.

The dyes of formula (3a) to (3i) are also known and can be prepared according to known procedures, for example from WO 2009/037215, WO 2008/049758, WO 2005/056690, WO 2000/040656, U.S. Pat. No. 3,980,634, EP 0 667 376, WO 2002/068539, WO 2002/074864, EP 0 436 940, EP 0 555 179, EP 0 894 830 and WO 2004/044058.

The present invention thus is directed to a dye mixture comprising at least one dye of formula (1)

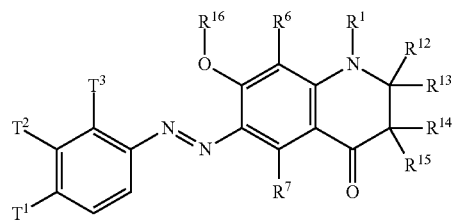

(1)

and at least one dye selected from the group consisting of dyes of formulae (3a), (3b), (3c), (3d), (3e), (3f), (3g), (3h) and (3i)

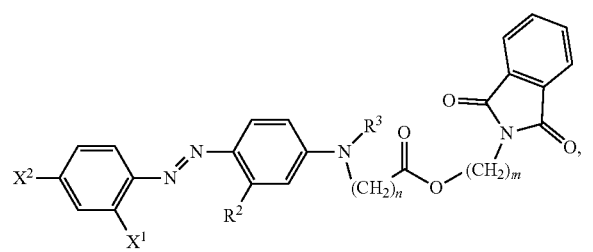

(3a)

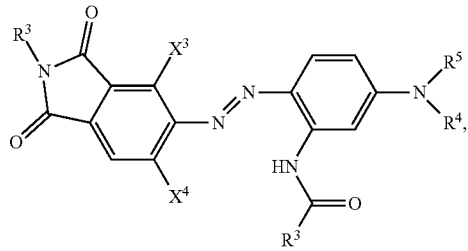

(3b)

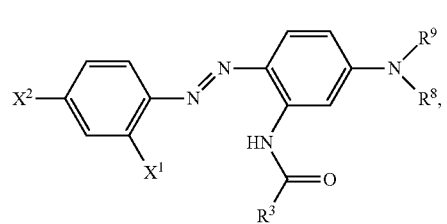

(3c)

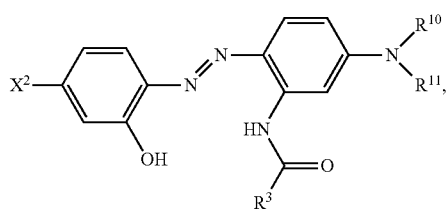

(3d)

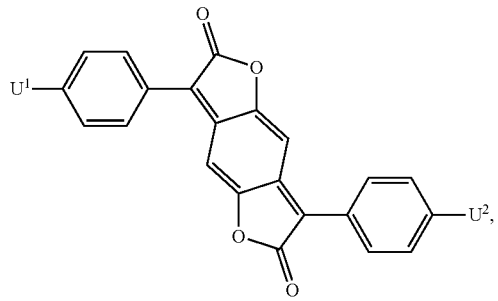

(3e)

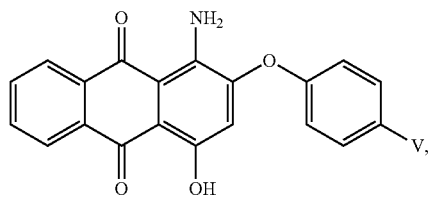

(3f)

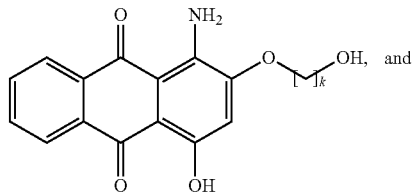

(3g)

(3h)

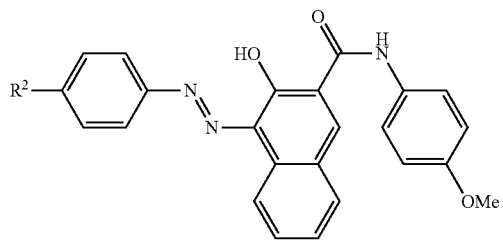

(3i)

wherein independent from each other $R^1$ is hydrogen, $(C_1\text{-}C_4)$-alkyl, $(C_1\text{-}C_4)$-alkenyl, $-(CH_2)_n-O-(C_1\text{-}C_4)$-alkyl, $-(CH_2)_n-O-CO-(C_1\text{-}C_4)$-alkyl, $-(CH_2)_n-COO-R^{100}$ or $-(CH_2)_n-CN$, $R^2$ is hydrogen, $-NH-CO-(C_1\text{-}C_4)$-alkyl or $(C_1\text{-}C_4)$-alkyl, $R^3$ is hydrogen or $(C_1\text{-}C_4)$-alkyl, $R^4$ and $R^5$ are hydrogen, $(C_1\text{-}C_4)$-alkyl, $(C_1\text{-}C_4)$-alkenyl, $-(CH_2)_n-O-(C_1\text{-}C_4)$-alkyl, $-(CH_2)_n-O-CO-(C_1\text{-}C_4)$-alkyl, $-(CH_2)_n-COO-(C_1\text{-}C_4)$-alkyl or $-CHCH_3-COO-(C_1\text{-}C_4)$-alkyl, $R^6$ and $R^7$ are hydrogen, $(C_1\text{-}C_4)$-alkyl, $(C_1\text{-}C_4)$-alkoxy or halogen, $R^8$ and $R^9$ are hydrogen, $-(CH_2)_n-O-CO-(C_1\text{-}C_4)$-alkyl or $-(CH_2)_n-COO-(C_1\text{-}C_4)$-alkyl, $R^{10}$ and $R^{11}$ are hydrogen, $(C_1\text{-}C_4)$-alkyl, $(C_1\text{-}C_4)$-alkenyl, $-(CH_2)_n-O-(C_1\text{-}C_4)$-alkyl, $-(CH_2)_n-O-CO-(C_1\text{-}C_4)$-alkyl or $-(CH_2)_n-COO-(C_1\text{-}C_4)$-alkyl, $R^{12}$ to $R^{16}$ are hydrogen or $(C_1\text{-}C_4)$-alkyl, $R^{100}$ is $(C_1\text{-}C_4)$-alkyl, phenyl or benzyl, $X^1$ and $X^2$ are hydrogen, nitro, cyano, halogen or carboxy, $X^3$ and $X^4$ are hydrogen, cyano, or halogen, $Y^1$ is hydrogen, $-(CH_2)_m$-phenyl, $(C_1\text{-}C_4)$-alkyl, $(C_1\text{-}C_4)$-alkenyl, $-(CH_2)_n-O-(C_1\text{-}C_4)$-alkyl, $-(CH_2)_n-O-CO-(C_1\text{-}C_4)$-alkyl or $-(CH_2)_n-COO-(C_1\text{-}C_4)$-alkyl, $T^1$ to $T^3$ are hydrogen, carboxy, $(C_1\text{-}C_4)$-alkyl, $(C_1\text{-}C_4)$-alkyoxy, halogen, cyano or nitro n is 1, 2, 3 or 4, m is 1, 2, 3 or 4, V is hydrogen, OH, $O-(C_1\text{-}C_4)$-alkyl, halogen, $-O-CH_2-CO-CH_3$, $-CH_2$-pyrolidonyl or $-SO_2-NH-(CH_2)_n-O-(C_1\text{-}C_4)$-alkyl, k is 2 to 8 and $U^1$ and $U^2$ are

| $U^1$ | $U^2$ |
|---|---|
| H | *—O—CH₂—C(=O)—O—CH₂CH₂—O—CH₂CH₃ |
| CH₃CH₂CH₂—O—* | *—O—CH₂—C(=O)—O—CH₂CH₂—O—CH₂CH₃ |
| CH₃CH₂CH₂—O—* | H |
| CH₃CH₂—O—* | H |
| (CH₃)₂CH—O—* | H |
| CH₃CH₂CH₂CH₂—O—* | H |
| HO—CH₂CH₂CH₂—O—* | H |
| (tetrahydrofuran-2-yl)-CH₂—O—* | H |

| $U^1$ | $U^2$ |
|---|---|
| 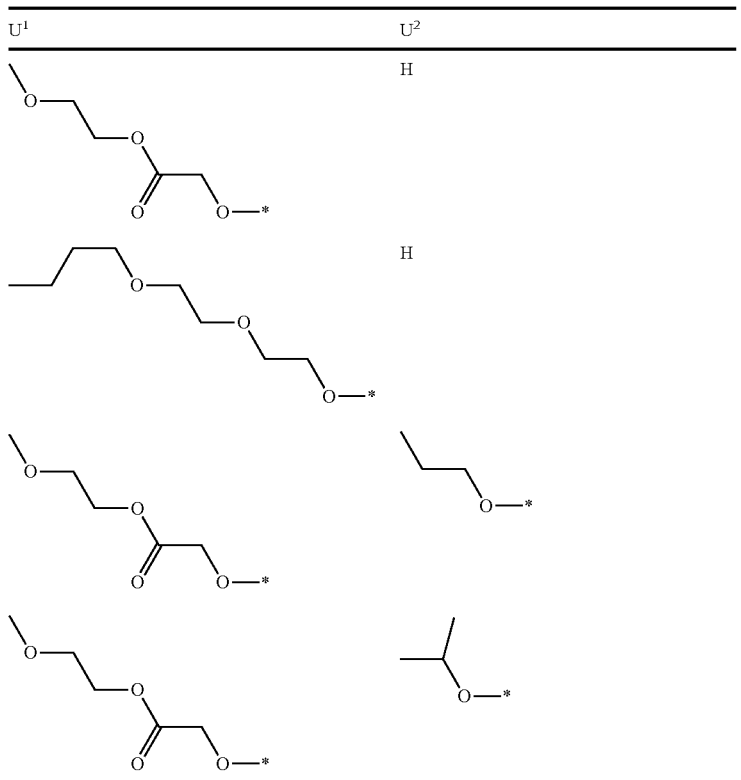 | H |
|  | H |
|  |  |
|  |  | whereby * marks the linkage to the phenyl-ring.

A dye mixture as described above, wherein independent from each other
$R^1$ is hydrogen, $(C_1-C_2)$-alkyl, $(C_1-C_2)$-alkenyl, $-(CH_2)_n-O-(C_1-C_2)$-alkyl, $-(CH_2)_n-O-CO-(C_1-C_2)$-alkyl, $-(CH_2)_n-COO-(C_1-C_2)$-alkyl or $-(CH_2)_n-CN$,
$R^2$ is hydrogen, $NH-CO-(C_1-C_2)$-alkyl or $(C_1-C_2)$-alkyl,
$R^3$ is hydrogen, methyl or ethyl,
$R^4$ and $R^5$ are hydrogen, $(C_1-C_2)$-alkyl, $(C_1-C_2)$-alkenyl, $-(CH_2)_n-O-(C_1-C_2)$-alkyl, $-(CH_2)_n-O-CO-(C_1-C_2)$-alkyl, $-(CH_2)_n-COO-(C_1-C_2)$-alkyl or $-CHCH_3-COO-(C_1-C_2)$-alkyl,
$R^6$ and $R^7$ are hydrogen, $(C_1-C_2)$-alkyl, $(C_1-C_2)$-alkoxy, bromo or chloro,
$R^8$ and $R^9$ are hydrogen, $-(CH_2)_n-O-CO-(C_1-C_2)$-alkyl or $-(CH_2)_n-COO-(C_1-C_2)$-alkyl,
$R^{10}$ and $R^{11}$ are hydrogen, $(C_1-C_2)$-alkyl, $(C_1-C_2)$-alkoxy, $(C_1-C_4)$-alkenyl, $-(CH_2)_n-O-(C_1-C_2)$-alkyl, $-(CH_2)_n-O-CO-(C_1-C_2)$-alkyl or $-(CH_2)_n-COO-(C_1-C_2)$-alkyl,
$R^{12}$ to $R^{16}$ are hydrogen or $(C_1-C_2)$-alkyl,
$X^1$ and $X^2$ are hydrogen, nitro, cyano, bromo, chloro or $-COO(C_1-C_2)$-alkyl
$X^3$ and $X^4$ are hydrogen, bromo or chloro,
$Y^1$ is hydrogen, $-(CH_2)_m$-phenyl, $(C_1-C_2)$-alkyl, $(C_1-C_4)$-alkenyl, $-(CH_2)_n-O-(C_1-C_2)$-alkyl, $-(CH_2)_n-O-CO-(C_1-C_2)$-alkyl or $-(CH_2)_n-COO-(C_1-C_2)$-alkyl,
$T^1$ to $T^3$ are hydrogen, $-COO(C_1-C_2)$-alkyl, bromo, chloro, cyano or nitro
$n$ is 1, 2 or 3,
$m$ is 1 or 2,
$V$ is hydrogen, OH, $O-(C_1-C_2)$-alkyl, halogen, $-O-CH_2-CO-CH_3$, $-CH_2$-pyrolidonyl or $-SO_2-NH-(CH_2)_n-O-(C_1-C_2)$-alkyl,
$k$ is 3 to 6 and $U^1$ and $U^2$ are

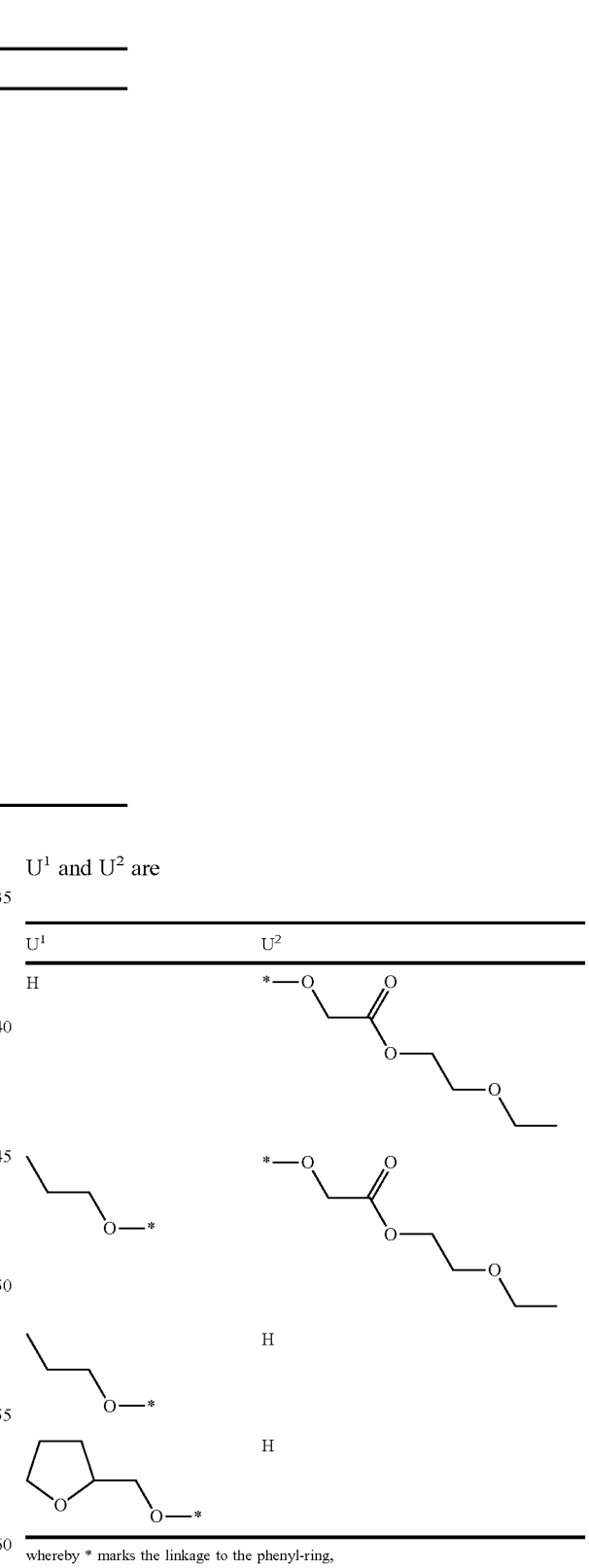

whereby * marks the linkage to the phenyl-ring,
forms a preferred aspect of the present invention.

More preferred is a dye mixture as described above, wherein independent from each other
$R^1$ is ethyl, cyanoethyl or $-(CH_2)_n-COO-(C_1-C_2)$-alkyl,
$R^2$ is hydrogen or $NH-COCH_3$,
$R^3$ is methyl or ethyl, $R^4$ and $R^5$ are $(C_1$-$C_2)$-alkyl, —$(CH_2)_n$—O—$(C_1$-$C_2)$-alkyl, —$(CH_2)_n$—COO—$(C_1$-$C_2)$-alkyl or —$CHCH_3$—COO—$(C_1$-$C_2)$-alkyl, $R^6$, $R^7$, $R^{12}$ to $R^{16}$ and $T^2$ are hydrogen, $R^8$ and $R^9$ are —$(CH_2)_n$—COO—$(C_1$-$C_2)$-alkyl, $R^{10}$ and $R^{11}$ are —$(CH_2)_n$—O—$(C_1$-$C_2)$-alkyl, —$(CH_2)_n$—O—CO—$(C_1$-$C_2)$-alkyl or —$(CH_2)_n$—COO—$(C_1$-$C_2)$-alkyl, $X^1$, $X^2$, $X^3$, $T^1$ and $T^3$ are hydrogen, nitro, cyano, bromo or chloro, $X^4$ is bromo or cyano, $Y^1$ is $(CH_2)_m$-phenyl, $(C_1$-$C_2)$-alkyl, $(C_1$-$C_4)$-alkenyl, $(C_1$-$C_2)$-alkoxy, —$(CH_2)_n$—O—$(C_1$-$C_2)$-alkyl, —$(CH_2)_n$—O—CO—$(C_1$-$C_2)$-alkyl or —$(CH_2)_n$—COO—$(C_1$-$C_2)$-alkyl, n and m are 1 or 2 and $U^1$ and $U^2$ are

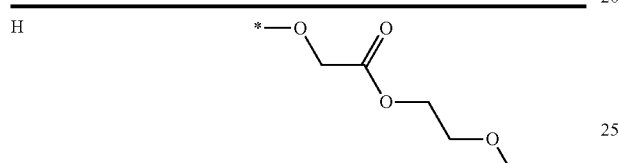

whereby * marks the linkage to the phenyl-ring.

The dye mixtures above may comprise e.g. one dye of formula (1) and one dye of e.g. formula (3a). They may also comprise e.g. one dye of formula (1) and two different dyes of e.g. formula (3a). A dye mixture comprising e.g. one dye of formula (1), one dye of formula (3a) and one dye of formula (3b) would form yet another aspect of the invention. Also dye mixtures, which comprise e.g. two, three or more different dyes of formula (1) and one dye of e.g. formula (3a) forms an aspect of the present invention. The same is true for dye mixtures comprising two or more different dyes of formula (1) and two or more different dyes of e.g. formula (3a). And even dye mixtures comprising two or more different dyes of formula (1) and two or more different dyes selected from different formulae (3a) to (3i) are part of the present invention.

Of all these mixtures of the present invention those are preferred, wherein one dye of formula (1) is present and one dye of formula (3a) to (3i), i.e. a two-component mixture is preferred.

All these dye mixtures may be as such, i.e. may consist of the dyes mentioned above or may also comprise other dyes not specifically mentioned as shading components.

Particularly preferred is
a dye mixture as described above, comprising at least one dye of formula (3c),
a dye mixture as described above, comprising at least one dye of formula (3d),
a dye mixture as described above, comprising at least one dye of formula (3f) and
a dye mixture as described above, comprising at least one dye of formula (3e).

A dye mixture as described above, wherein the dye or dyes of formula (1) is/are selected from the group consisting of:

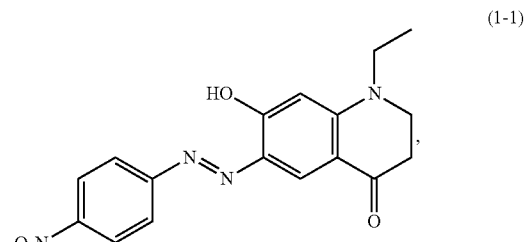

(1-1)

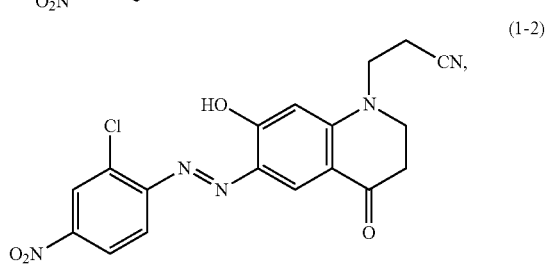

(1-2)

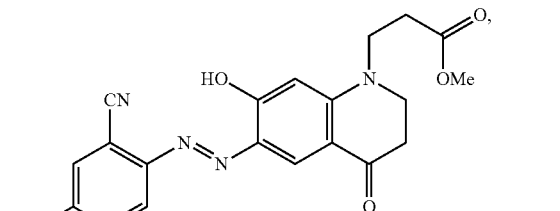

(1-3)

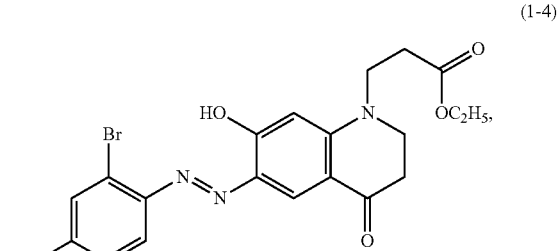

(1-4)

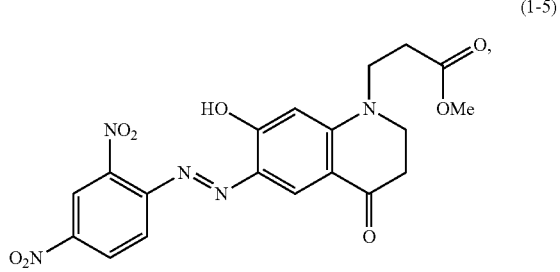

(1-5)

-continued

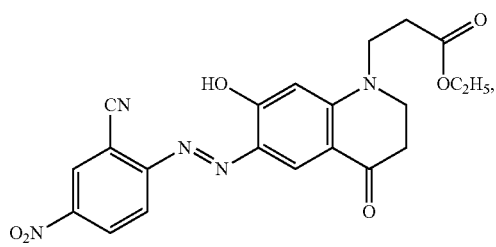
(1-6)

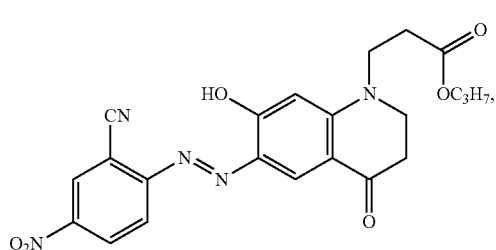
(1-7)

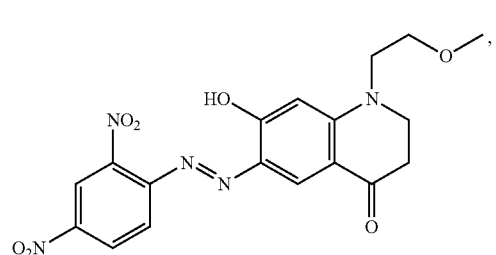
(1-8)

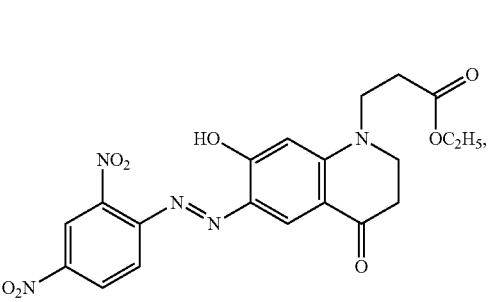
(1-9) and

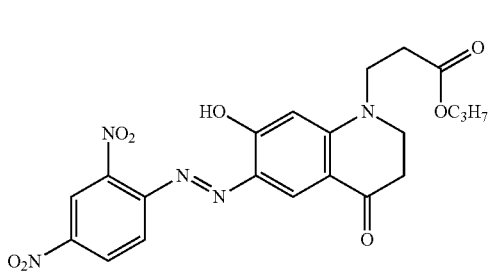
(1-10)

forms a preferred aspect of the present invention. A dye mixture comprising one dye of formula (1-1) to (1-10) is particularly preferred.

Also for the dyes of formulae (3a) to (3i) there exist particularly preferred ones.

A dye mixture as described above, wherein the dye or dyes of formula (3a) are selected from the group consisting of

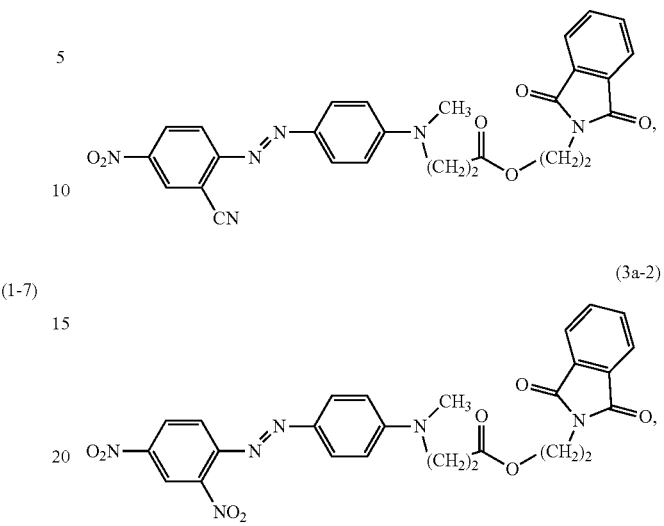

is preferred. A dye mixture comprising one dye of formula (3a-1) to (3a-4) is particularly preferred.

A dye mixture as described above, wherein the dye or dyes of formula (3b) are selected from the group consisting of (3b-1)

-continued (3b-2)
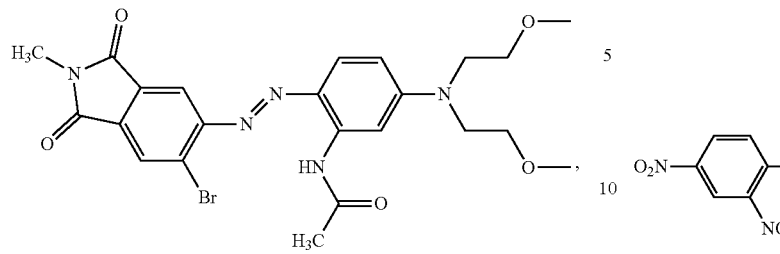

(3b-3)
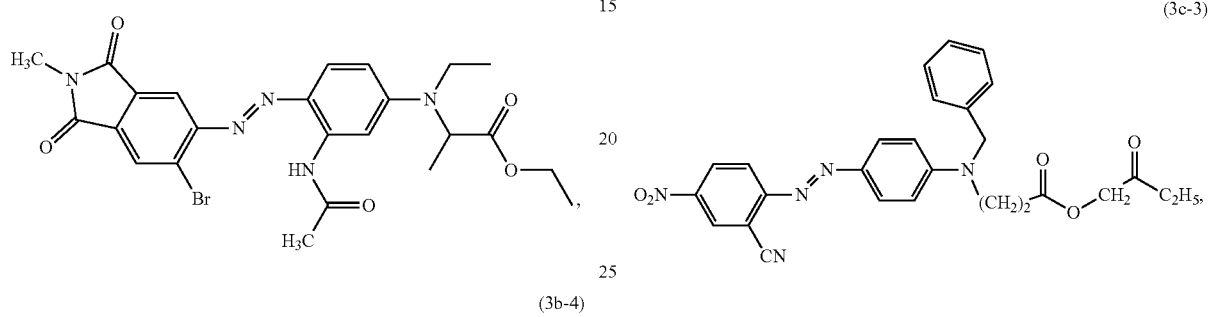

(3b-4)

(3b-5)

A dye mixture comprising one dye of formula (3b-1) to (3b-5) is particularly preferred.

A dye mixture as described above, wherein the dye or dyes of formula (3c) are selected from the group consisting of (3c-1)
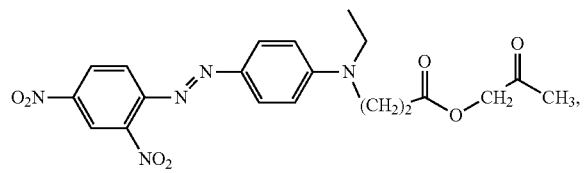

-continued (3c-2)
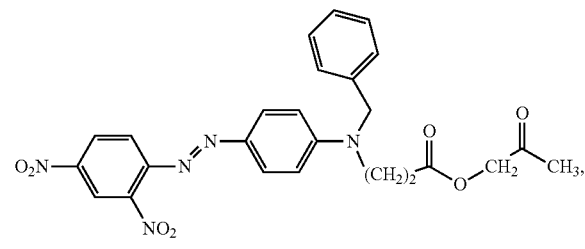

(3c-3)
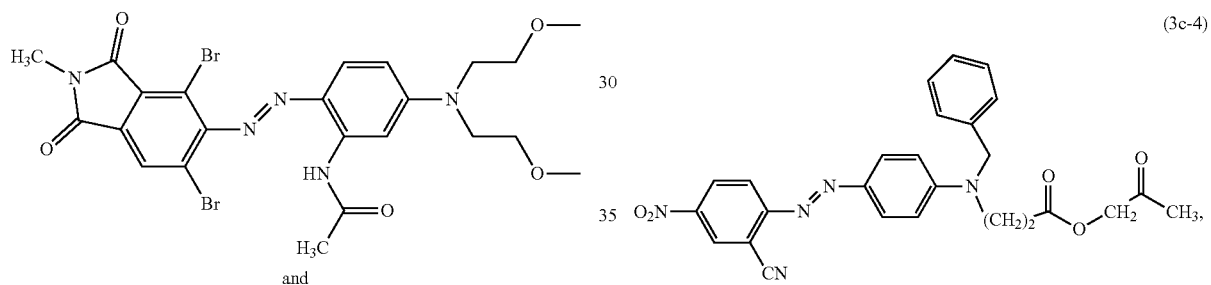

(3c-4)
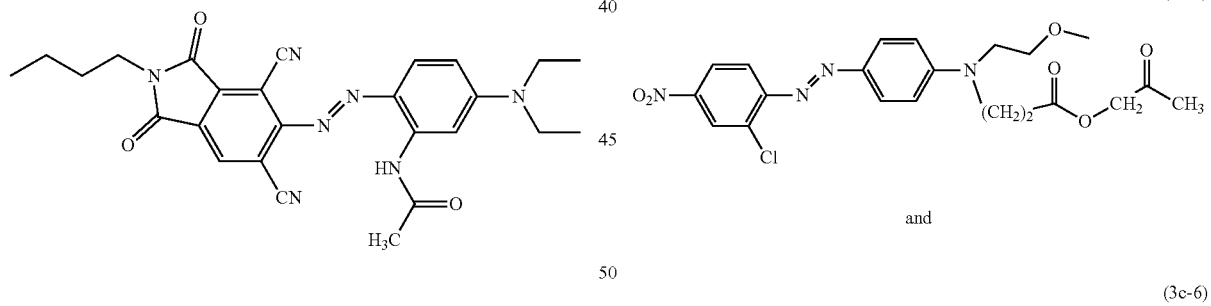

(3c-5)

and (3c-6)
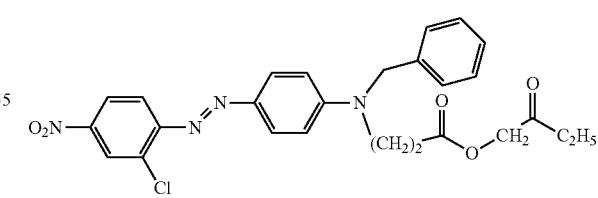

is preferred.

A dye mixture comprising one dye of formula (3c-1) to (3c-6) is particularly preferred.

A dye mixture as described above, wherein the dye or dyes of formula (3d) are selected from the group consisting of

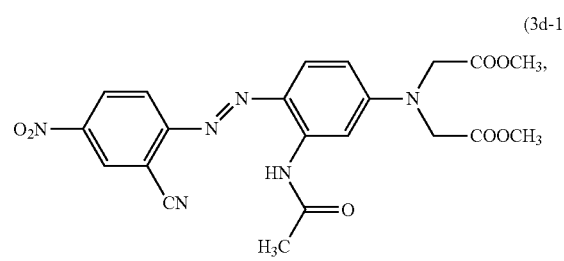
(3d-1)
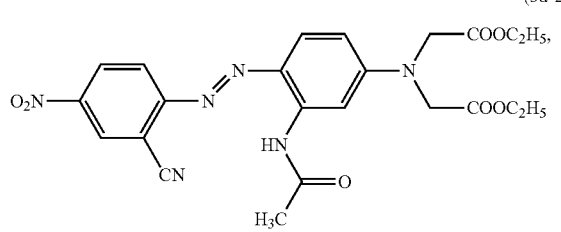
(3d-2)
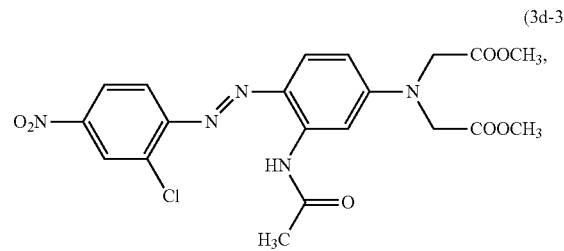
(3d-3)
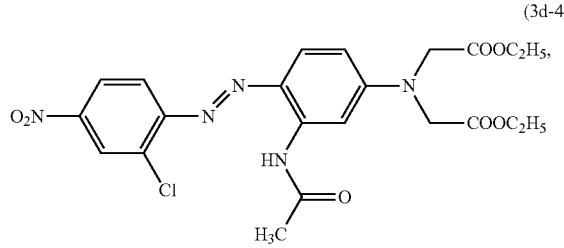
(3d-4)
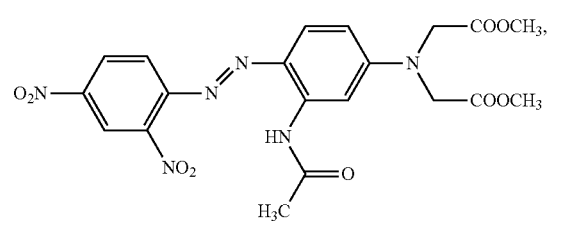
(3d-5)
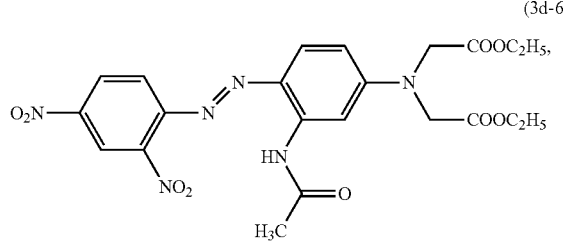
(3d-6)
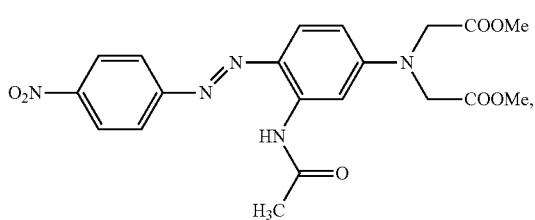
(3d-7)
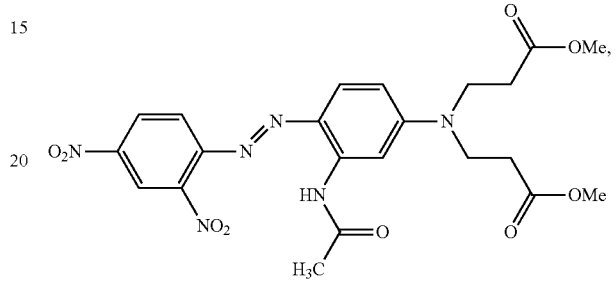
(3d-8)
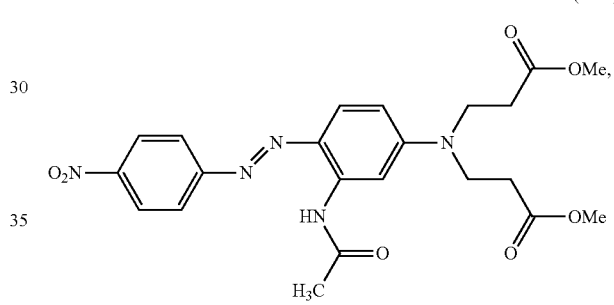
(3d-9)
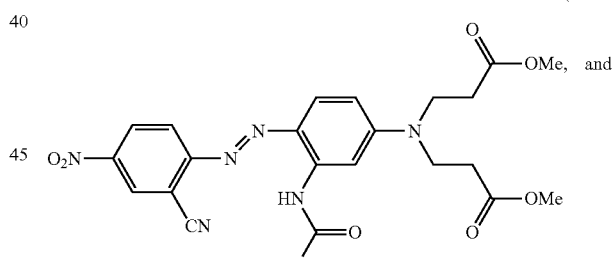
(3d-10)
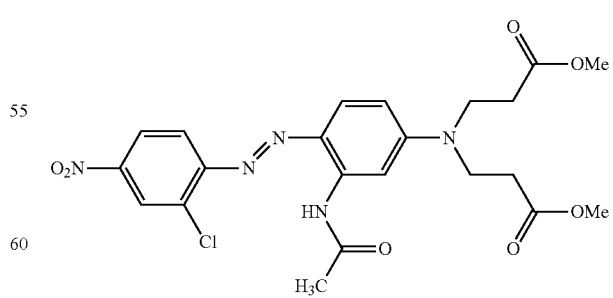
(3d-11)
(3d-11) is preferred.
A dye mixture comprising one dye of formula (3d-1) to (3d-11) is particularly preferred.

A dye mixture as described above, wherein the dye or dyes of formula (3e) are selected from the group consisting of
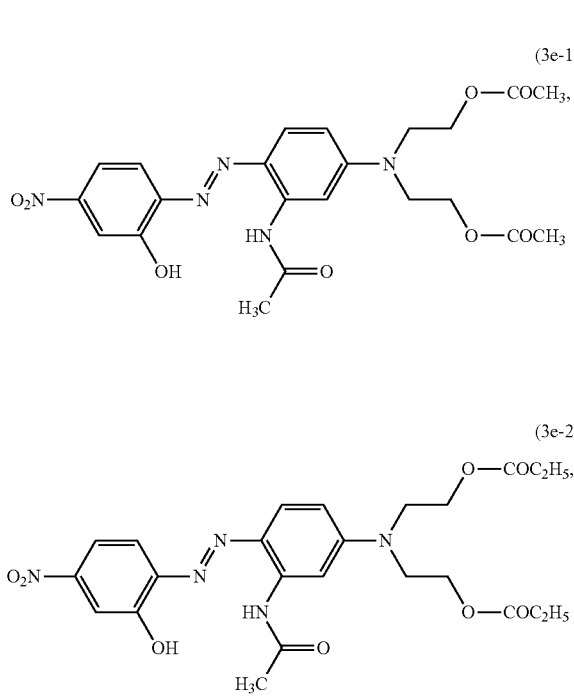
(3e-1)
(3e-2)
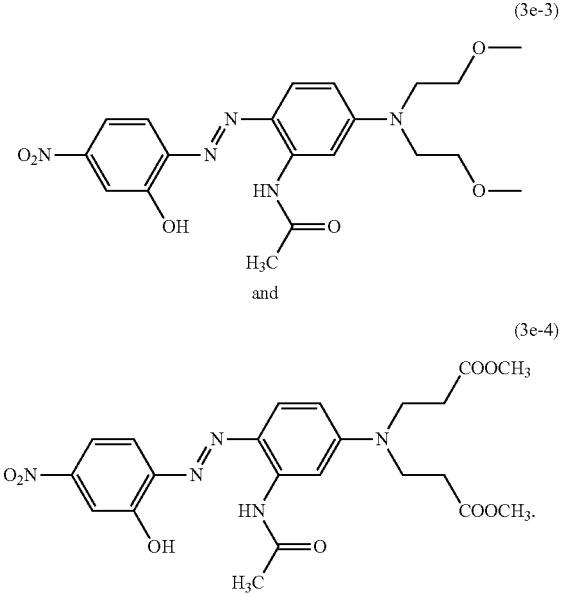
(3e-3)
and
(3e-4)
is preferred.
A dye mixture comprising one dye of formula (3e-1) to (3e-4) is particularly preferred.
A dye mixture as described above, wherein the dye or dyes of formula (3f) are selected from the group consisting of
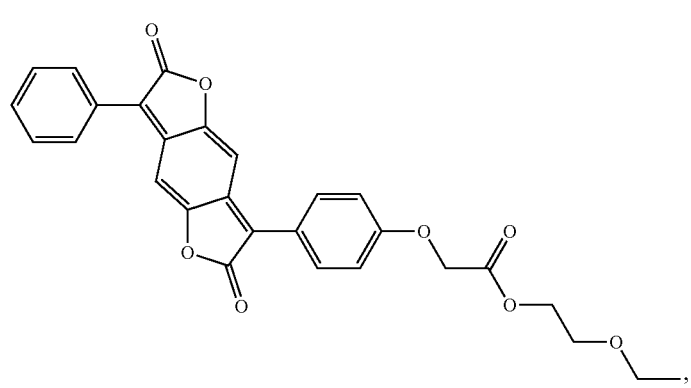
(3f-1)
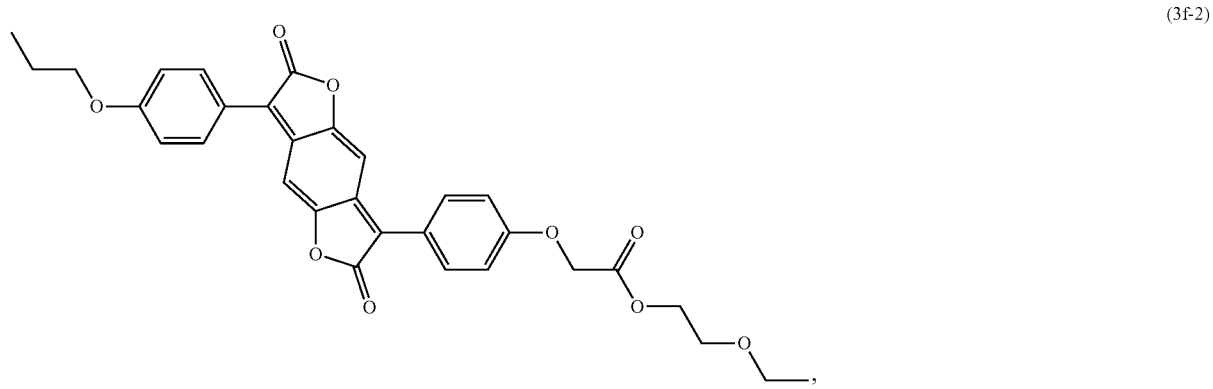
(3f-2)

-continued

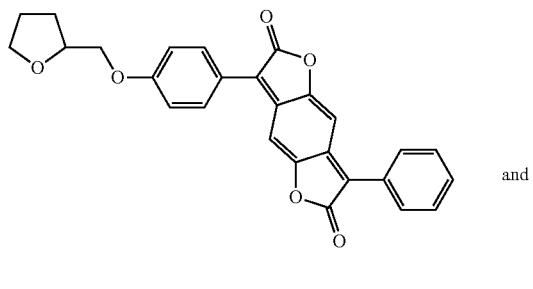
(3f-3)

and

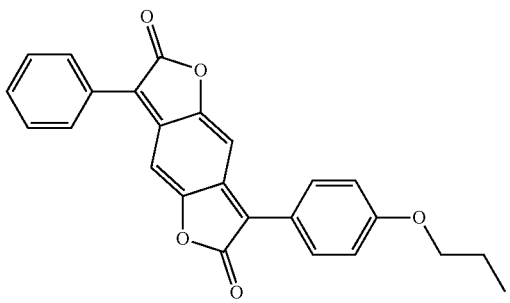
(3f-4)

is preferred.

And a dye mixture comprising one dye of formula (3f-1) to (3f-4) is particularly preferred.

A dye mixture as described above, wherein the dye or dyes of formula (3i) are selected from the group consisting of

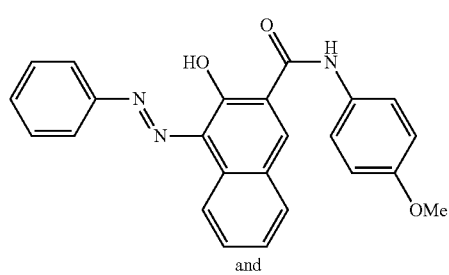
(3i-1)

and

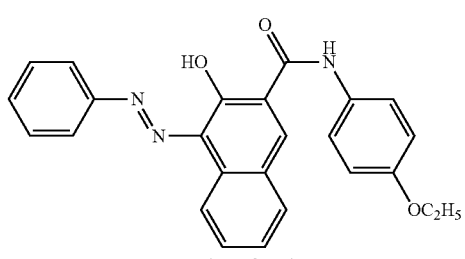
(3i-2)

is preferred.

A dye mixture comprising one dye of formula (3i-1) or (3i-2) is particularly preferred.

Particularly preferred is a dye mixture as described above, wherein the dye or dyes of formula (1) is/are selected from the list consisting of (1-3), (1-5), (1-6), (1-7), (1-9) and (1-10). Again a dye mixture is preferred, which comprises one of the these dyes.

Another particularly preferred dye mixture as described above is one, wherein the dye or dyes of formula (3c) is/are selected from the list consisting of (3c-2), (3c-3) and (3c-4). Again a dye mixture is preferred, which comprises one of the these dyes.

Most preferred is a dye mixture, which comprises one or more dyes selected from the list consisting of (1-3), (1-5), (1-6), (1-7), (1-9) and (1-10) and one or more dyes selected from the list consisting of (3c-2), (3c-3) and (3c-4). Again a mixture is preferred, wherein one dye of each list is selected.

There also exist preferred ranges of weight % of the components of the inventive dye mixtures and a dye mixture is preferred, wherein the amount of dyes in weight % of the overall amount of dyes in the mixture is:
(1) 80 to 20
sum of (3a/3b/3c/3d/3e/3f/3g/3h/3i) 20 to 80.

More preferred is a dye mixture, wherein the amount of dyes in weight % of the overall amount of dyes in the mixture is:
(1) 60 to 40
sum of (3a/3b/3c/3d/3e/3f/3g/3h/3i): 40 to 60.

In each dye mixture, the components (1) to (3i) add up to 100% in case the dye mixture consists of the dyes mentioned above or to less than 100% in case additional dyes are added e.g. as shading components. In such a case the amount of shading components preferably is less than 10, more preferred less than 5 and most preferred less than 2 weight % based on the weight of all dyes of the dye mixture.

A process for the production of a dye mixture as described above, comprising
a) mixing at least one dye of formula (1) with at least one dye of any one of formula (3a) to (3i) and
b) homegenizing the mixture obtained in step a)
forms another aspect of the present invention.

When the dye mixture of the present invention is used in dyeing, the dye mixture is dispersed in an aqueous medium by means of a dispersing agent and wetting agent in the usual way to prepare a dye bath for dyeing or a printing paste for textile printing.

Thus also an aqueous solution for dying comprising a dye mixture as described above forms an aspect of the present invention. And also the use of a dye mixture as described above and/or an aqueous solution as described above for dying fibers, as well as blends of such fibres selected from the group consisting of: synthetic fibers: nylon, nylon-6, nylon-6.6 and aramid fibres, vegetable fibres, seed fibres, cotton, organic cotton, kapok, coir from coconut husk; bast fibers, flax, hemp, jute, kenaf, ramie, rattan; leaf fibres, sisal, henequen, banana; stalk fibres, bamboo; fibres from animals, wool, organic wool, silk, cashmere wool, alpaca fiber, mohair, Angora fibre as well as fur and leather materials; manufactured, regenerated and recycled fibres, cellulosic fibres; paper fibres, cellulosic regenerated fibres, viscose rayon fibres, acetate and triacetate fibers and Lyocell fibers forms an aspect of the invention.

Typical examples of dispersing agent are lignosulphonates, naphthalene sulphonic acid/formaldehyde condensates and phenol/cresol/sulphanilic acid/formaldehyde condensates, typical examples of wetting agent are alkyl aryl ethoxylates which may be sulphonated or phosphated and typical example of other ingredients which may be present are inorganic salts, de-dusting agents such as mineral oil or nonanol, organic liquids and buffers. Dispersing agents may be present at from 30 to 500% based on the weight of the dye mixture. Dedusting agents may be used at from 0 to 5% based on the weight of the dye mixture.

For example, in the case of dyeing polyester fibres and fibre mixture products such as blended yarn fabrics of union cloth product comprising polyester fibres can be dyed with good colour fastness by common dyeing methods, such as a high temperature dyeing method, a carrier dyeing method and a thermosol dyeing method. In some cases, the addition of an acid substance to the dye bath may result in even more successful dyeing.

Suitable process conditions may be selected from the following:

(i) exhaust dyeing at a pH of from 4 to 8.5, at a temperature of from 125 to 140° C. for from 10 to 120 minutes and under a pressure of from 1 to 2 bar, a sequestrant optionally being added;

(ii) continuous dyeing at a pH of from 4 to 8.5, at a temperature of from 190 to 225° C. for from 15 seconds to 5 minutes, a migration inhibitor optionally being added;

(iii) direct printing at a pH of from 4 to 6.5, at a temperature of from 160 to 185° C. for from 4 to 15 minutes for high temperature steaming, or at a temperature of from 190 to 225° C. for from 15 seconds to 5 minutes for bake fixation with dry heat or at a temperature of from 120 to 140° C. and 1 to 2 bar for from 10 to 45 minutes for pressure steaming, wetting agents and thickeners (such as alginates) of from 5 to 100% by weight of the dye optionally being added;

(iv) discharge printing (by padding the dye on to the textile material, drying and overprinting) at a pH of from 4 to 6.5, migration inhibitors and thickeners optionally being added;

(v) carrier dyeing at a pH of from 4 to 7.5, at a temperature of from 95 to 100° C. using a carrier such as methylnaphthalene, diphenylamine or 2-phenylphenol, sequestrants optionally being added; and (vi) atmospheric dyeing of acetate, triacetate and nylon at a pH of from 4 to 7.5, at a temperature of about 85° C. for acetate or at a temperature of about 90° C. for triacetate and nylon for from 15 to 90 minutes, sequestrants optionally being added.

In all the above processes, the dye mixture is applied as a dispersion comprising from 0.001 to 20 wt. %, preferably from 0.005 to 16 wt. %, of the inventive dye mixture in an aqueous medium.

In addition to the above-mentioned application processes, the dye mixture may be applied to synthetic textile materials and fibre blends by ink-jet printing, the substrates optionally having been pre-treated to aid printing.

An ink for digital textile printing, comprising a dye mixture as described above is another aspect of the present invention.

For ink-jet applications, the application medium may comprise water and a water-soluble organic solvent, preferably in a weight ratio of 1:99 to 99:1, more preferably 1:95 to 50:50 and especially in the range 10:90 to 40:60. The water-soluble organic solvent preferably comprises a $C_1$-$C_4$-alkanol, especially methanol or ethanol, a ketone, especially acetone or methyl ethyl ketone, 2-pyrrolidone or N-methylpyrrolidone, a glycol, especially ethylene glycol, propylene glycol, trimethylene glycol, butane-2,3-diol, thiodiglycol or diethylene glycol, a glycol ether, especially ethylene glycol monomethyl ether, propylene glycol monomethyl ether or diethylene glycol monomethyl ether, urea, a sulphone, especially bis-(2-hydroxyethyl) sulphone or mixtures thereof.

The dyestuff may also be applied to textile materials using supercritical carbon dioxide, in which case the dye formulating agents may optionally be omitted.

The synthetic textile material may preferably be selected from aromatic polyester, especially polyethylene terephthalate, polyamide, especially polyhexamethylene adipamide, secondary cellulose acetate, cellulose triacetate, and natural textile materials, especially cellulosic materials and wool. An especially preferred textile material is an aromatic polyester or fibre blend thereof with fibres of any of the above mentioned textile materials. Especially preferred fibre blends include those of polyester-cellulose, such as polyester-cotton, and polyester-wool. The textile materials or blends thereof may be in the form of filaments, loose fibres, yarn or woven or knitted fabrics.

Particularly, among polyester fibres, not only ordinary polyester fibres (regular denier fibres) but also microfibres (fine denier fibres, which are less than 0.6 denier) may be used as fibres which can successfully be dyed with the dye mixture of the present invention.

In general all kinds of fibres can be dyed and therefore fiber and blends containing such fiber selected from the group consisting of: synthetic fibre materials, nylon materials, nylon-6, nylon-6.6 and aramid fibres, vegetable fibers, seed fibers, cotton, organic cotton, kapok, coir from coconut husk; bast fibers, flax, hemp, jute, kenaf, ramie, rattan; leaf fibers, sisal, henequen, banana; stalk fibers, bamboo; fibers from animals, wool, organic wool, silk, cashmere wool, alpaca fiber, mohair, Angora fiber as well as fur and leather materials; manufactured, regenerated and recycled fibers, cellulosic fibers; paper fibers, cellulosic regenerated fibers, viscose rayon fibers, acetate and triacetate fibers, and Lyocell fibers comprising a dye mixture as described above either in chemically and/or physically bound form forms/form another aspect of the present invention.

The examples which follow serve to illustrate the invention. Parts and percentages are by weight unless noted otherwise. The relationship of parts by weight to parts by volume is that of the kilogram to the litre.

EXAMPLE 1

50 parts dye of the formula (1-7) were mixed with 50 parts of a dye of the formula (3d-1).

The resulting dye mixture of the invention was formulated using dispersing agent, glass bead milling and dried via spray drying. The resulting Dyestuff mixture gives deep red dyeing's and prints with good build-up and wet-fastness, both on polyester or polyester blends for example, under the dyeing conditions typical for disperse dyes.

EXAMPLE 2

70 parts dye of the formula (1-6) were mixed with 25 parts of a dye of the formula (3f-1) and mixed with 5 parts of a dye powder of the formula (1-3).

The resulting dye mixture of the invention was formulated using dispersing agent, glass bead milling and dried via spray drying. The resulting Dyestuff mixture gives bright scarlet dyeing's and prints with very good wet-fastness, on polyester or polyester blends for example, under the dyeing conditions typical for disperse dyes.

EXAMPLE 3

60 parts dye of the formula (1-6) were mixed with 40 parts of a dye powder of the formula (3a-1).

The resulting dye mixture of the invention was formulated using dispersing agent, glass bead milling and dried via spray drying. The resulting Dyestuff mixture gives red dyeing's and prints with good build-up and wet-fastness, on polyester or polyester blends for example, under the dyeing conditions typical for disperse dyes.

EXAMPLE 4

71 parts dye of the formula (1-6) were mixed with 29 parts of a dye powder of the formula (3f-2).
The resulting dye mixture of the invention was formulated using dispersing agent, glass bead milling and dried via spray drying. The resulting Dyestuff mixture gives bright red dyeing's or prints with very good wet-fastness, on polyester or polyester blends for example, under the dyeing conditions typical for disperse dyes.

EXAMPLE 5

50 parts dye of the formula (1-7) were mixed with 50 parts of a dye of the formula (3g-1).
The resulting dye mixture of the invention was formulated using dispersing agent, glass bead milling and dried via spray drying. The resulting Dyestuff mixture gives bright red dyeing's or prints with good wet-fastness, on polyester or polyester blends for example, under the dyeing conditions typical for disperse dyes.

EXAMPLE 6

55 parts dye of the formula (1-6) were mixed with 5 parts of a dye of the formula (1-3) and mixed with 40 parts of a dye of the formula (3c-4).
The resulting dye mixture of the invention was formulated using dispersing agent, glass bead milling and dried via spray drying. The resulting Dyestuff mixture gives deep red dyeings or prints with good build-up and wet-fastness, on polyester or polyester blends for example, under the dyeing conditions typical for disperse dyes.

All examples of the following tables are prepared as formulations as explained above. The shades of the dyeings or prints on polyester are red or scarlet.

| Example | Dye of formula (1) | Dye of formula (1) | Dye of formula (1) | Dye of formula (3) | Dye of formula (3) | Ratio |
|---|---|---|---|---|---|---|
| 7 | 1-3 | | | 3a-1 | | 61:39 |
| 8 | 1-3 | | | 3b-1 | | 70:30 |
| 9 | 1-3 | | | 3b-2 | | 60:40 |
| 10 | 1-3 | | | 3b-3 | | 70:30 |
| 11 | 1-3 | | | 3b-4 | | 40:60 |
| 12 | 1-3 | | | 3c-4 | | 70:30 |
| 1 | 1-3 | | | 3c-4 | | 60:40 |
| 14 | 1-3 | | | 3c-4 | | 50:50 |
| 15 | 1-3 | | | 3d-1 | | 70:30 |
| 16 | 1-3 | | | 3d-1 | | 60:40 |
| 17 | 1-3 | | | 3d-1 | | 50:50 |
| 18 | 1-3 | | | 3d-3 | | 65:35 |
| 19 | 1-3 | | | 3d-5 | | 40:60 |
| 20 | 1-3 | | | 3d-9 | | 70:30 |
| 21 | 1-3 | | | 3e-1 | | 75:25 |
| 22 | 1-3 | | | 3f-1 | | 80:20 |
| 23 | 1-3 | | | 3f-2 | | 70:30 |
| 24 | 1-3 | | | 3f-3 | | 50:50 |
| 25 | 1-3 | | | 3f-4 | | 60:40 |
| 26 | 1-3 | | | 3i-1 | | 70:30 |
| 27 | 1-3 | | | 3g-1 | | 40:60 |
| 28 | 1-9 | | | 3g-2 | | 20:80 |
| 29 | 1-3 | | | 3g-3 | | 50:50 |
| 30 | 1-3 | | | 3g-4 | | 50:50 |
| 31 | 1-10 | | | 3h-1 | | 55:45 |
| 32 | 1-6 | | | 3b-1 | | 65:35 |
| 33 | 1-6 | | | 3b-2 | | 60:40 |
| 34 | 1-6 | | | 3b-3 | | 70:30 |
| 35 | 1-6 | | | 3b-4 | | 65:35 |
| 36 | 1-6 | | | 3c-4 | | 70:30 |
| 37 | 1-6 | | | 3c-4 | | 60:40 |
| 38 | 1-6 | | | 3c-4 | | 50:50 |
| 39 | 1-6 | | | 3d-1 | | 75:25 |
| 40 | 1-6 | | | 3d-1 | | 65:35 |
| 41 | 1-6 | | | 3d-1 | | 55:45 |
| 42 | 1-6 | | | 3d-3 | | 65:35 |
| 43 | 1-6 | | | 3d-5 | | 50:50 |
| 44 | 1-6 | | | 3d-9 | | 70:30 |
| 45 | 1-6 | | | 3e-1 | | 75:25 |
| 46 | 1-6 | | | 3f-1 | | 80:20 |
| 47 | 1-6 | | | 3f-3 | | 50:50 |
| 48 | 1-6 | | | 3f-4 | | 60:40 |
| 49 | 1-6 | | | 3i-1 | | 70:30 |
| 50 | 1-6 | | | 3g-1 | | 40:60 |
| 51 | 1-6 | | | 3g-2 | | 55:45 |
| 52 | 1-6 | | | 3g-3 | | 20:80 |
| 53 | 1-6 | | | 3g-4 | | 50:50 |
| 54 | 1-6 | | | 3h-1 | | 55:45 |
| 55 | 1-7 | | | 3a-1 | | 65:35 |
| 56 | 1-7 | | | 3b-1 | | 65:35 |
| 57 | 1-7 | | | 3b-2 | | 60:40 |
| 58 | 1-7 | | | 3b-3 | | 70:30 |

-continued
| Example | Dye of formula (1) | Dye of formula (1) | Dye of formula (1) | Dye of formula (3) | Dye of formula (3) | Ratio |
|---|---|---|---|---|---|---|
| 59 | 1-7 | | | 3b-4 | | 65:35 |
| 60 | 1-7 | | | 3c-4 | | 70:30 |
| 61 | 1-7 | | | 3c-4 | | 60:40 |
| 62 | 1-7 | | | 3c-4 | | 50:50 |
| 63 | 1-7 | | | 3d-1 | | 75:25 |
| 64 | 1-7 | | | 3d-1 | | 65:35 |
| 65 | 1-7 | | | 3d-3 | | 65:35 |
| 66 | 1-7 | | | 3d-5 | | 50:50 |
| 67 | 1-7 | | | 3d-9 | | 70:30 |
| 68 | 1-7 | | | 3e-1 | | 75:25 |
| 69 | 1-7 | | | 3f-1 | | 80:20 |
| 70 | 1-9 | | | 3f-2 | | 70:30 |
| 71 | 1-7 | | | 3f-3 | | 50:50 |
| 72 | 1-7 | | | 3f-4 | | 40:60 |
| 73 | 1-10 | | | 3i-1 | | 70:30 |
| 74 | 1-7 | | | 3g-2 | | 40:60 |
| 75 | 1-7 | | | 3g-3 | | 50:50 |
| 76 | 1-7 | | | 3g-4 | | 20:80 |
| 77 | 1-7 | | | 3h-1 | | 55:45 |
| 78 | 1-3 | 1-6 | 1-7 | 3c-4 | | 30:10:20:40 |
| 79 | 1-3 | 1-6 | | 3c-4 | | 55:10:35 |
| 80 | 1-3 | 1-7 | | 3c-4 | | 60:10:30 |
| 81 | 1-6 | 1-7 | | 3c-4 | | 60:5:35 |
| 82 | 1-3 | | | 3c-4 | 3d-1 | 50:25:25 |
| 83 | 1-3 | | | 3c-4 | 3d-5 | 60:20:20 |
| 84 | 1-6 | | | 3c-4 | 3d-1 | 60:15:25 |
| 85 | 1-6 | | | 3c-4 | 3d-5 | 55:20:25 |
| 86 | 1-6 | 1-3 | | 3a-1 | | 59:6:35 |
| 87 | 1-6 | 1-3 | | 3b-1 | | 59:6:35 |
| 88 | 1-6 | 1-3 | | 3b-2 | | 55:5:40 |
| 89 | 1-6 | 1-3 | | 3b-3 | | 64:6:30 |
| 90 | 1-6 | 1-3 | | 3b-4 | | 59:6:35 |
| 91 | 1-6 | 1-3 | | 3c-4 | | 55:5:40 |
| 92 | 1-6 | 1-3 | | 3d-1 | | 55:5:40 |
| 93 | 1-6 | 1-3 | | 3d-3 | | 50:5:45 |
| 94 | 1-6 | 1-3 | | 3d-5 | | 59:6:35 |
| 95 | 1-6 | 1-3 | | 3d-9 | | 46:4:50 |
| 96 | 1-6 | 1-3 | | 3e-1 | | 64:6:30 |
| 97 | 1-6 | 1-3 | | 3f-2 | | 73:7:20 |
| 98 | 1-6 | 1-3 | | 3f-3 | | 64:6:30 |
| 99 | 1-6 | 1-3 | | 3f-4 | | 45:5:50 |
| 100 | 1-6 | 1-3 | | 3i-1 | | 54:6:40 |
| 101 | 1-6 | 1-3 | | 3g-1 | | 64:6:30 |
| 102 | 1-6 | 1-3 | | 3g-2 | | 55:5:40 |
| 103 | 1-6 | 1-3 | | 3g-3 | | 50:5:45 |
| 104 | 1-6 | 1-3 | | 3g-4 | | 45:5:50 |
| 105 | 1-6 | 1-3 | | 3h-1 | | 45:5:50 |
| 106 | 1-6 | 1-3 | | 3h-1 | 3d-1 | 45:5:25:25 |
The invention claimed is:
1. A dye mixture comprising
at least one dye of formula (1)
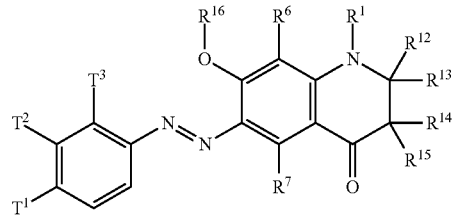
and
at least one dye selected from the group consisting of dyes of formulae (3a), (3b), (3c), (3d), (3e), (3f), (3g), (3h) and (3i)
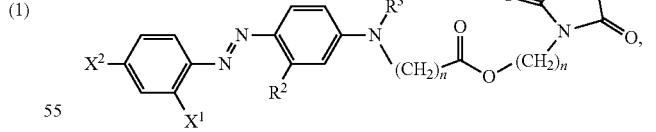
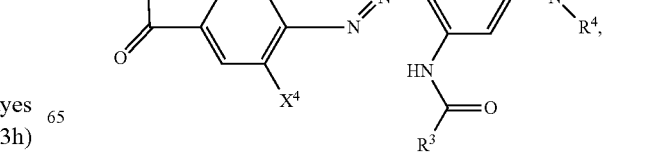

(3c) 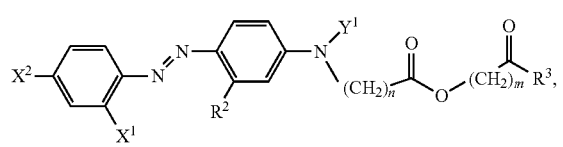

(3d) 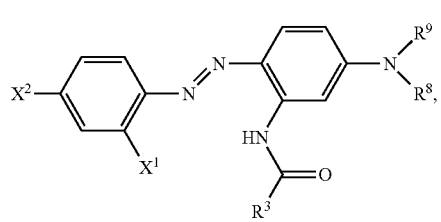

(3e) 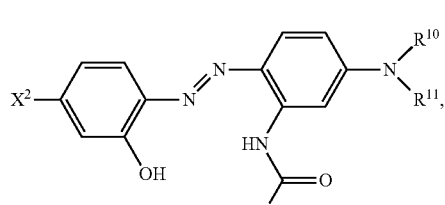

(3f) 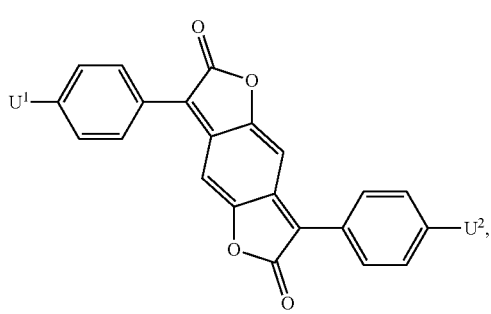

(3g) 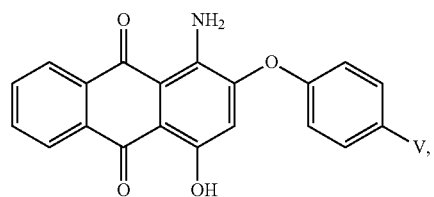

(3h) 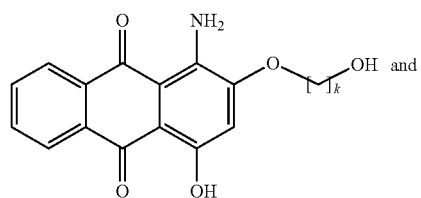

(3i) 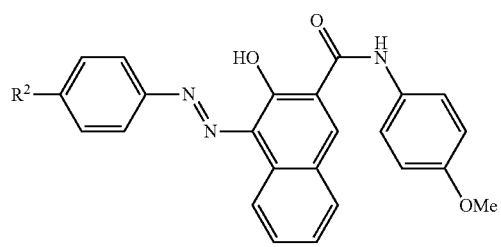

wherein independent from each other
R$^1$ is hydrogen, ($C_1$-$C_4$)-alkyl, ($C_1$-$C_4$)-alkenyl, —($CH_2$)—O—($C_1$-$C_4$)-alkyl, —($CH_2$)$_n$—O—CO—($C_1$-$C_4$)-alkyl, —($CH_2$)$_n$—COO—R$^{100}$ or —($CH_2$)$_n$—CN,
R$^2$ is hydrogen, —NH—CO—($C_1$-$C_4$)-alkyl or ($C_1$-$C_4$)-alkyl,
R$^3$ is hydrogen or ($C_1$-$C_4$)-alkyl,
R$^4$ and R$^5$ are hydrogen, ($C_1$-$C_4$)-alkyl, ($C_1$-$C_4$)-alkenyl, —($CH_2$)—O—($C_1$-$C_4$)-alkyl, —($CH_2$)$_n$—O—CO—($C_1$-$C_4$)-alkyl, —($CH_2$)$_n$—COO—($C_1$-$C_4$)-alkyl or —CHCH$_3$—COO—($C_1$-$C_4$)-alkyl,
R$^6$ and R$^7$ are hydrogen, ($C_1$-$C_4$)-alkyl, ($C_1$-$C_4$)-alkoxy or halogen,
R$^8$ and R$^9$ are hydrogen, —($CH_2$)$_n$—O—CO—($C_1$-$C_4$)-alkyl or —($CH_2$)$_n$—COO—($C_1$-$C_4$)-alkyl,
R$^{10}$ and R$^{11}$ are hydrogen, ($C_1$-$C_4$)-alkyl, ($C_1$-$C_4$)-alkenyl, —($CH_2$)—O—($C_1$-$C_4$)-alkyl, —($CH_2$)$_n$—O—CO—($C_1$-$C_4$)-alkyl or —($CH_2$)$_n$—COO—($C_1$-$C_4$)-alkyl,
R$^{12}$ to R$^{16}$ are hydrogen or ($C_1$-$C_4$)-alkyl,
R$^{100}$ is ($C_1$-$C_4$)-alkyl, phenyl or benzyl,
X$^1$ and X$^2$ are hydrogen, nitro, cyano, halogen or carboxy,
X$^3$ and X$^4$ are hydrogen, cyano, or halogen,
Y$^1$ is hydrogen, —($CH_2$)$_m$-phenyl, ($C_1$-$C_4$)-alkyl, ($C_1$-$C_4$)-alkenyl, —($CH_2$)—O—($C_1$-$C_4$)-alkyl, —($CH_2$)—O—CO—($C_1$-$C_4$)-alkyl or —($CH_2$)—COO—($C_1$-$C_4$)-alkyl,
T$^1$ to T$^3$ are hydrogen, carboxy, ($C_1$-$C_4$)-alkyl, ($C_1$-$C_4$)-alkyoxy, halogen, cyano or nitro
n is 1, 2, 3 or 4,
m is 1, 2, 3 or 4,
V is hydrogen, OH, O—($C_1$-$C_4$)-alkyl, halogen, —O—$CH_2$—CO—$CH_3$, —$CH_2$-pyrolidonyl or —$SO_2$—NH—($CH_2$)$_n$—O—($C_1$-$C_4$)-alkyl,
k is 2 to 8 and
U$^1$ and U$^2$ are

| U$^1$ |
|---|
| H |
| 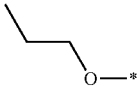 [SMILES: *OCCC] |
| 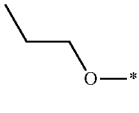 |
| 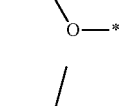 |
| 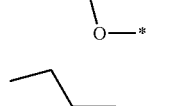 |
| 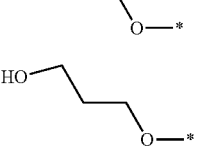 |

-continued

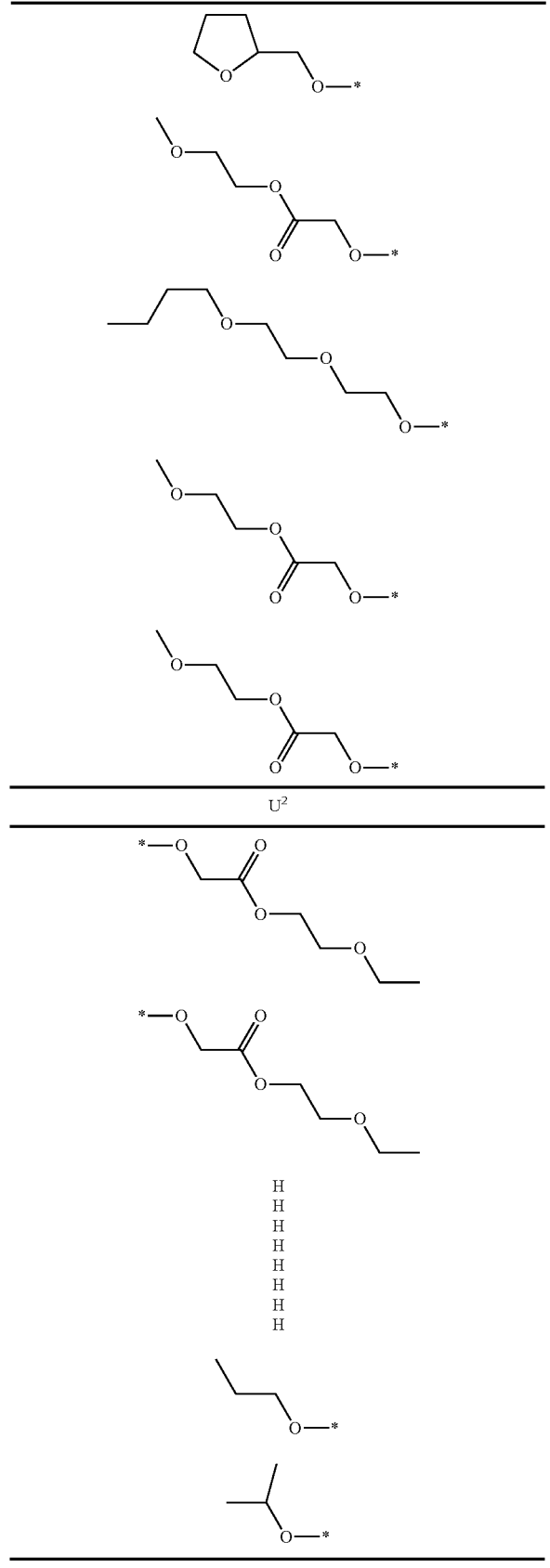

whereby * marks the linkage to the phenyl-ring.

2. The dye mixture according to claim 1,
wherein independent from each other
$R^1$ is hydrogen, $(C_1\text{-}C_2)$-alkyl, $(C_1\text{-}C_2)$-alkenyl, $-(CH_2)_n-O-(C_1\text{-}C_2)$-alkyl, $-(CH_2)_n-O-CO-(C_1\text{-}C_2)$-alkyl, $-(CH_2)_n-COO-(C_1\text{-}C_2)$-alkyl or $-(CH_2)_n-CN$,
$R^2$ is hydrogen, $NH-CO-(C_1\text{-}C_2)$-alkyl or $(C_1\text{-}C_2)$-alkyl,
$R^3$ is hydrogen, methyl or ethyl,
$R^4$ and $R^5$ are hydrogen, $(C_1\text{-}C_2)$-alkyl, $(C_1\text{-}C_2)$-alkenyl, $-(CH_2)_n-O-(C_1\text{-}C_2)$-alkyl, $-(CH_2)_n-O-CO-(C_1\text{-}C_2)$-alkyl, $-(CH_2)_n-COO-(C_1\text{-}C_2)$-alkyl or $-CHCH_3-COO-(C_1\text{-}C_2)$-alkyl,
$R^6$ and $R^7$ are hydrogen, $(C_1\text{-}C_2)$-alkyl, $(C_1\text{-}C_2)$-alkoxy, bromo or chloro,
$R^8$ and $R^9$ are hydrogen, $-(CH_2)_n-O-CO-(C_1\text{-}C_2)$-alkyl or $-(CH_2)_n-COO-(C_1\text{-}C_2)$-alkyl,
$R^{10}$ and $R^{11}$ are hydrogen, $(C_1\text{-}C_2)$-alkyl, $(C_1\text{-}C_2)$-alkoxy, $(C_1\text{-}C_4)$-alkenyl, $-(CH_2)_n-O-(C_1\text{-}C_2)$-alkyl, $-(CH_2)_n-O-CO-(C_1\text{-}C_2)$-alkyl or $-(CH_2)_n-COO-(C_1\text{-}C_2)$-alkyl,
$R^{12}$ to $R^{16}$ are hydrogen or $(C_1\text{-}C_2)$-alkyl,
$X^1$ and $X^2$ are hydrogen, nitro, cyano, bromo, chloro or $-COO(C_1\text{-}C_2)$-alkyl
$X^3$ and $X^4$ are hydrogen, bromo or chloro,
$Y^1$ is hydrogen, $-(CH_2)_m$-phenyl, $(C_1\text{-}C_2)$-alkyl, $(C_1\text{-}C_4)$-alkenyl, $-(CH_2)_n-O-(C_1\text{-}C_2)$-alkyl, $-(CH_2)_n-O-CO-(C_1\text{-}C_2)$-alkyl or $-(CH_2)_n-COO-(C_1\text{-}C_2)$-alkyl,
$T^1$ to $T^3$ are hydrogen, $-COO(C_1\text{-}C_2)$-alkyl, bromo, chloro, cyano or nitro
n is 1, 2 or 3,
m is 1 or 2,
V is hydrogen, OH, $O-(C_1\text{-}C_2)$-alkyl, halogen, $-O-CH_2-CO-CH_3$, $-CH_2$-pyrolidonyl or $-SO_2-NH-(CH_2)_n-O-(C_1\text{-}C_2)$-alkyl,
k is 3 to 6 and
$U^1$ and $U^2$ are whereby * marks the linkage to the phenyl-ring.

3. The dye mixture according to claim 1,
wherein independent from each other
$R^1$ is ethyl, cyanoethyl or —$(CH_2)_n$—COO—$(C_1$-$C_2)$-alkyl,
$R^2$ is hydrogen or NH—COCH$_3$,
$R^3$ is methyl or ethyl,
$R^4$ and $R^5$ are $(C_1$-$C_2)$-alkyl, —$(CH_2)_n$—O—$(C_1$-$C_2)$-alkyl, —$(CH_2)$—COO—$(C_1$-$C_2)$-alkyl or —CHCH$_3$—COO—$(C_1$-$C_2)$-alkyl,
$R^6$, $R^7$, $R^{12}$ to $R^{16}$ and $T^2$ are hydrogen,
$R^8$ and $R^9$ are —$(CH_2)_n$—COO—$(C_1$-$C_2)$-alkyl,
$R^{10}$ and $R^{11}$ are —$(CH_2)$—O—$(C_1$-$C_2)$-alkyl, —$(CH_2)$—O—CO—$(C_1$-$C_2)$-alkyl or —$(CH_2)_n$—COO—$(C_1$-$C_2)$-alkyl,
$X^1$, $X^2$, $X^3$, $T^1$ and $T^3$ are hydrogen, nitro, cyano, bromo or chloro,
$X^4$ is bromo or cyano,
$Y^1$ is —$(CH_2)_m$-phenyl, $(C_1$-$C_2)$-alkyl, $(C_1$-$C_4)$-alkenyl, $(C_1$-$C_2)$-alkoxy, —$(CH_2)_n$—O—$(C_1$-$C_2)$-alkyl, —$(CH_2)_n$—O—CO—$(C_1$-$C_2)$-alkyl or —$(CH_2)_n$—COO—$(C_1$-$C_2)$-alkyl,
n and m are 1 or 2 and
$U^1$ and $U^2$ are

| $U^1$ | $U^2$ |
|---|---|
| H | *—O—CH$_2$—C(=O)—O—CH$_2$CH$_2$—O—CH$_2$CH$_3$ |
| CH$_3$CH$_2$CH$_2$—O—* | *—O—CH$_2$—C(=O)—O—CH$_2$CH$_2$—O—CH$_2$CH$_3$ |
| CH$_3$CH$_2$CH$_2$—O—* | H |
| (tetrahydrofuran-2-yl)CH$_2$—O—* | H | whereby * marks the linkage to the phenyl-ring.

4. The dye mixture according to claim 1, wherein the dye or dyes of formula (1) is/are selected from the group consisting of:

(1-1)

(1-2)

(1-3)

(1-4)

(1-5)

(1-6)

(1-7)

-continued
(1-8)
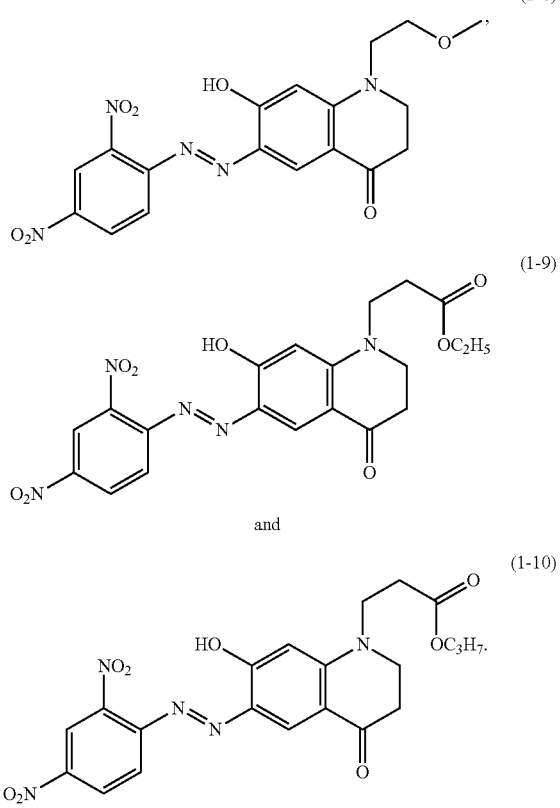
(1-9)
(1-10)
and
5. The dye mixture according to claim 1, wherein the dye or dyes of formula (3a) are selected from the group consisting of
(3a-1)
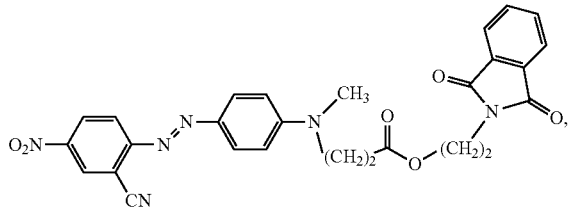
(3a-2)
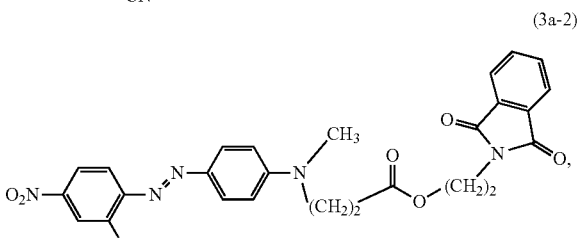
(3a-3)
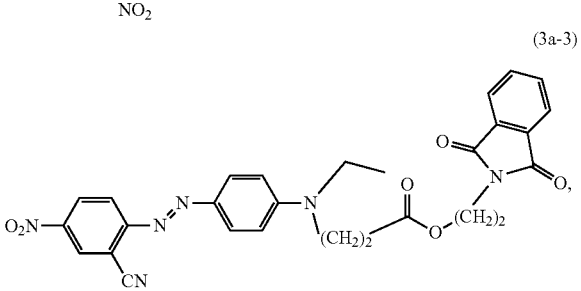
-continued
and
(3a-4)
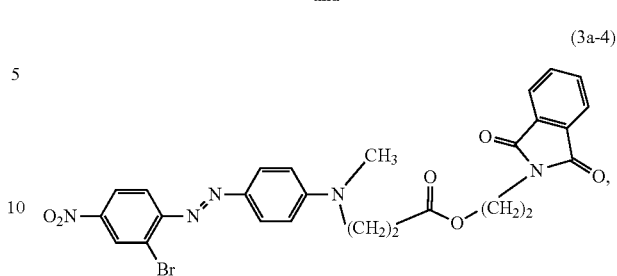
6. The dye mixture according to claim 1, wherein the dye or dyes of formula (3b) are selected from the group consisting of
(3b-1)
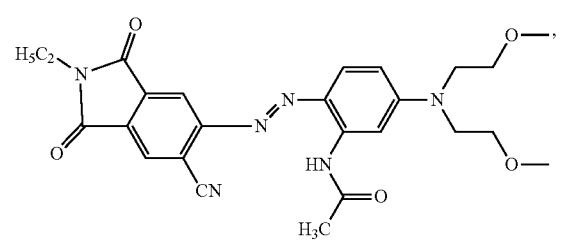
(3b-2)
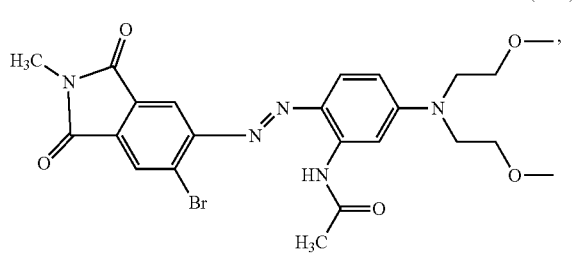
(3b-3)
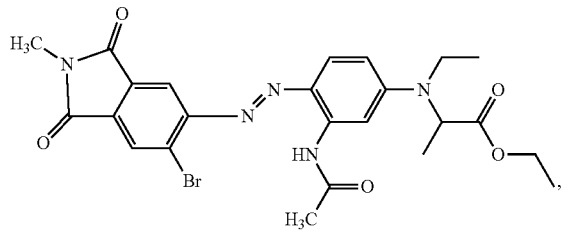
(3b-4)
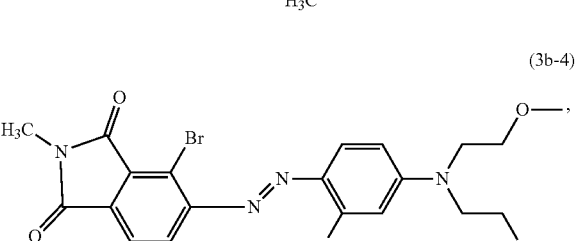
and (3b-5)
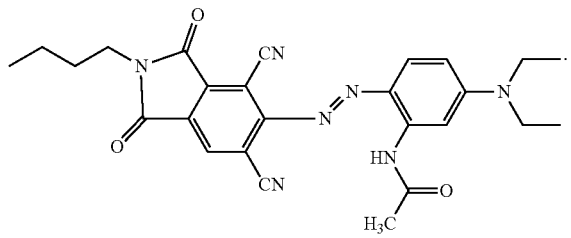
7. The dye mixture according to claim 1, wherein the dye or dyes of formula (3c) are selected from the group consisting of
(3c-1)
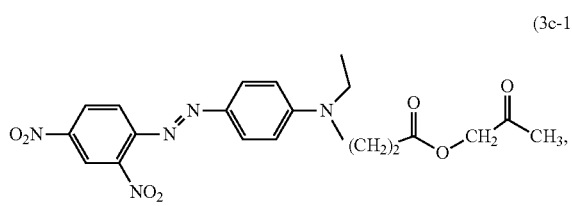
(3c-2)
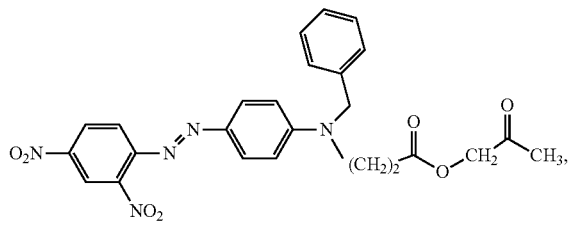
(3c-3)
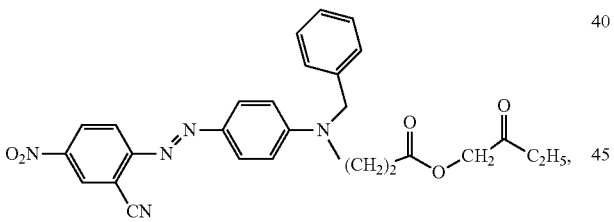
(3c-4)
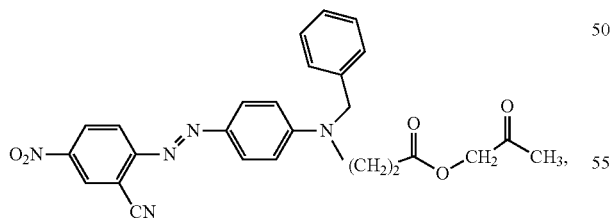
(3c-5)
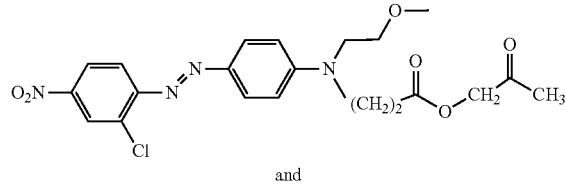
and
(3c-6)
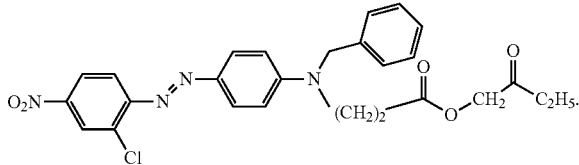
8. The dye mixture according to claim 1, wherein the dye or dyes of formula (3d) are selected from the group consisting of
(3d-1)
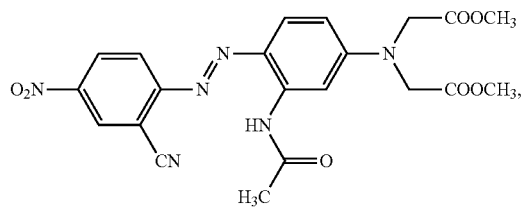
(3d-2)
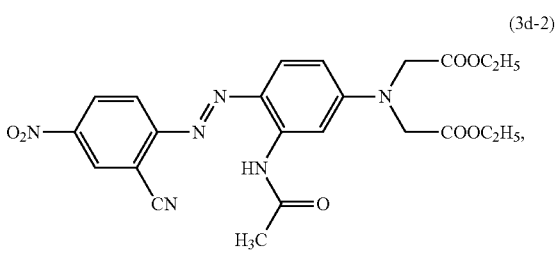
(3d-3)
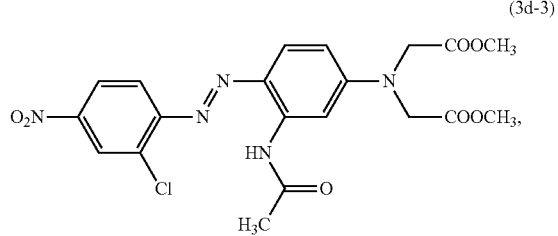
(3d-4)
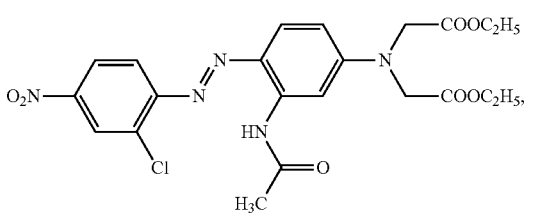
(3d-5)
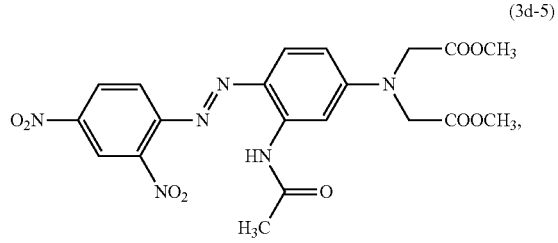

(3d-6)
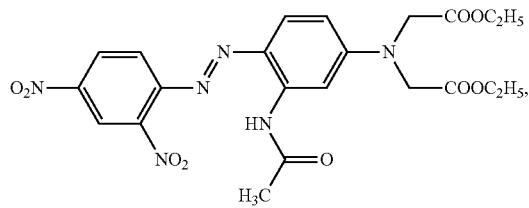
(3d-7)
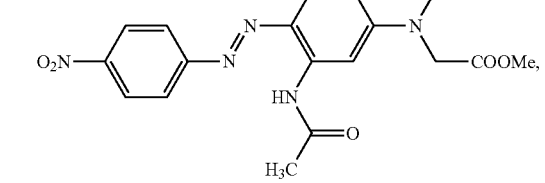
(3d-8)
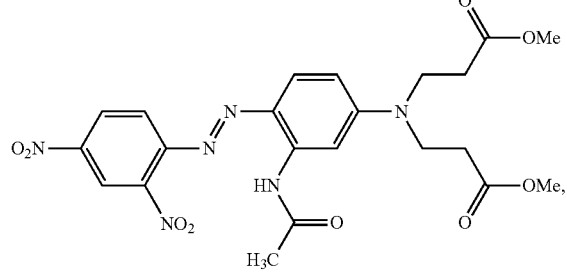
(3d-9)
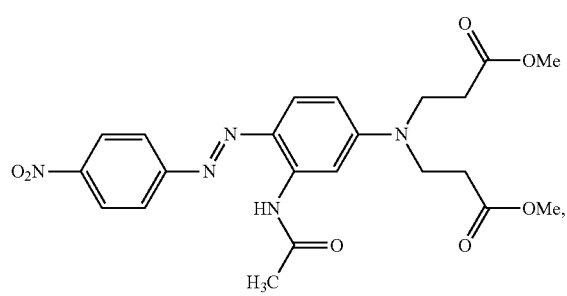
(3d-10)
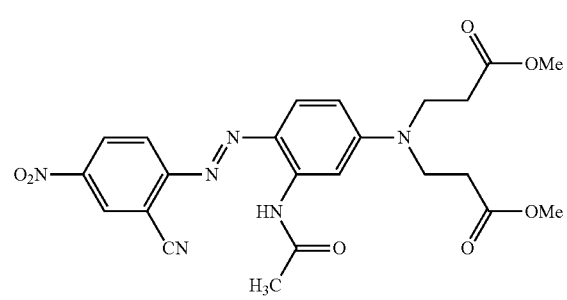
and
(3d-11)
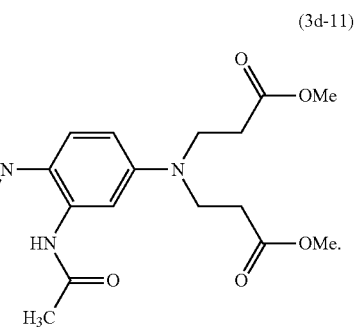
9. The dye mixture according to claim 1, wherein the dye or dyes of formula (3e) are selected from the group consisting of:
(3e-1)
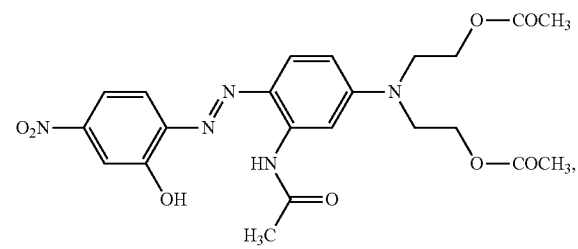
(3e-2)
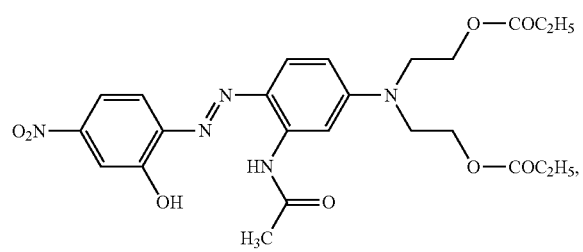
(3e-3)
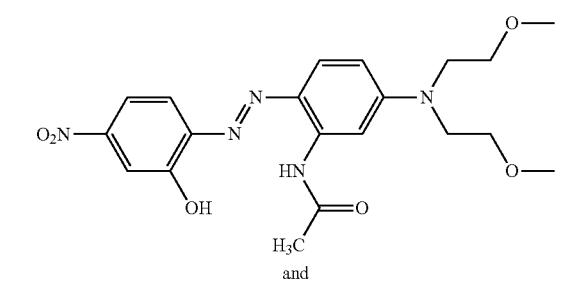
and
(3e-4)
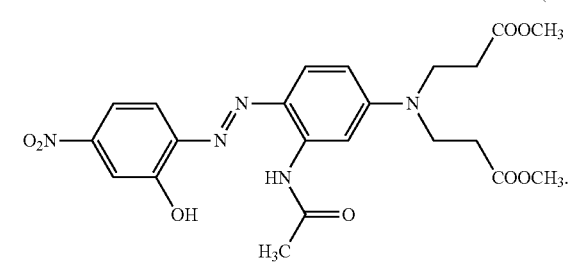

10. The dye mixture according to claim 1, wherein the dye or dyes of formula (3f) are selected from the group consisting of:

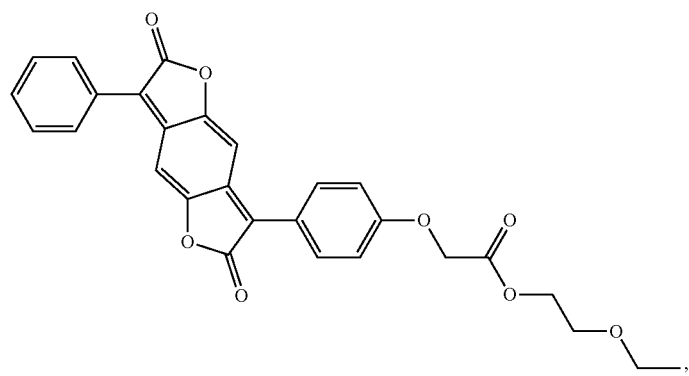
(3f-1)

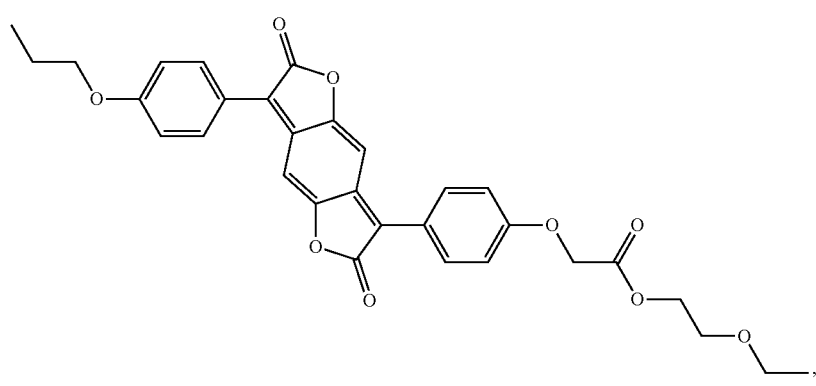
(3f-2)

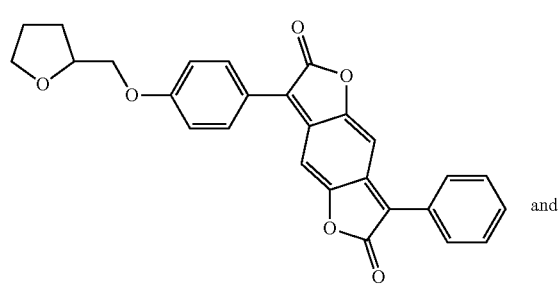
(3f-3)

and

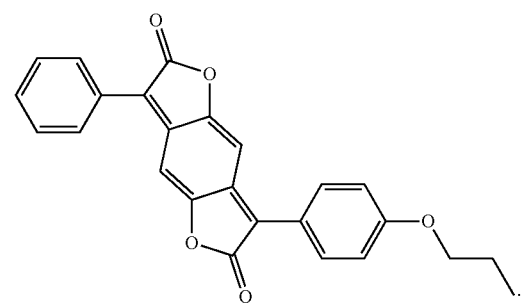
(3f-4)

11. The dye mixture according to claim 1, wherein the dye or dyes of formula (3i) are selected from the group consisting of:

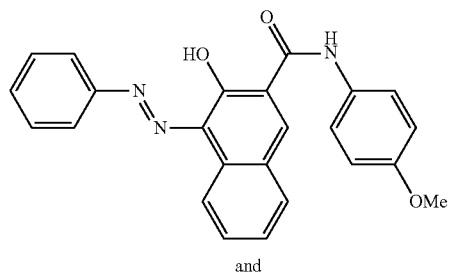
(3i-1)

and

-continued

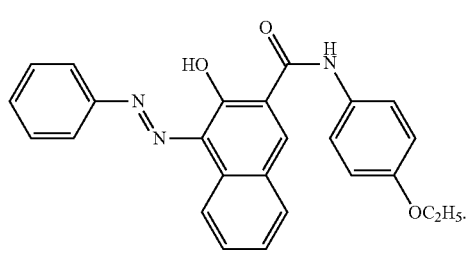
(3i-2)

12. The dye mixture according to claim 1, wherein the amount of dyes in weight % of the overall amount of dyes in the mixture is:

(1) 80 to 20 sum of (3a/3b/3c/3d/3e/3f/3g/3h/3i) 20 to 80.

13. A process for the production of a dye mixture according to claim 1, comprising
   a) mixing at least one dye of formula (1) with at least one dye of any one of formula (3a) to (3i) and
   b) homegenizing the mixture obtained in step a).

14. Aqueous solution comprising the dye mixture according to claim 1.

* * * * *